(12) United States Patent
Mueck et al.

(10) Patent No.: US 9,491,634 B2
(45) Date of Patent: Nov. 8, 2016

(54) SIGNAL BUFFERING FOR LICENSED SHARED ACCESS (LSA) TECHNOLOGY

(71) Applicant: Intel Corporation, Santa Clara, CA (US)

(72) Inventors: Markus Dominik Mueck, Neubiberg (DE); Michael Heimlich, Sydney (AU); Eryk Dutkiewicz, Sydney (AU); Gengfa Fang, Sydney (AU); Pierce Rixon, Sydney (AU); Beeshanga A. Jayawickrama, Sydney (AU)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 14/580,723

(22) Filed: Dec. 23, 2014

(65) Prior Publication Data

US 2016/0183267 A1    Jun. 23, 2016

(51) Int. Cl.
| | |
|---|---|
| *H04W 16/14* | (2009.01) |
| *H04W 72/04* | (2009.01) |
| *H04B 1/69* | (2011.01) |
| *H04L 5/00* | (2006.01) |
| *H04L 27/00* | (2006.01) |
| *H04W 72/12* | (2009.01) |

(52) U.S. Cl.
CPC .............. *H04W 16/14* (2013.01); *H04B 1/69* (2013.01); *H04L 5/0033* (2013.01); *H04L 5/0092* (2013.01); *H04L 27/0006* (2013.01); *H04W 72/0453* (2013.01); *H04W 72/0493* (2013.01); *H04W 72/1215* (2013.01)

(58) Field of Classification Search
None
See application file for complete search history.

(56) References Cited

U.S. PATENT DOCUMENTS

| | | | | |
|---|---|---|---|---|
| 2009/0191889 | A1* | 7/2009 | Abedi | H04W 16/06 455/452.1 |
| 2014/0321425 | A1* | 10/2014 | Mueck | H04W 76/066 370/331 |
| 2015/0181546 | A1* | 6/2015 | Freda | H04W 56/0015 370/336 |
| 2015/0304853 | A1* | 10/2015 | Murray | H04W 76/068 455/454 |
| 2015/0358968 | A1* | 12/2015 | Malladi | H04W 16/14 455/454 |

OTHER PUBLICATIONS

Badic, et al., "LSA Based Inter Cell Interference Mitigation", U.S. Appl. No. 14/578,157, filed Dec. 19, 2014, 51 pages.
Mueck, et al., "Licensed Shared Access Reverse Link and Message Feedback Control", U.S. Appl. No. 14/575,168, filed Dec. 18, 2014, 35 pages.

* cited by examiner

*Primary Examiner* — Ashley Shivers
(74) *Attorney, Agent, or Firm* — Forefront IP Lawgroup, PLLC

(57) ABSTRACT

Described herein are technologies related to an implementation of reducing a time cost of accessing a Licensed Shared Access (LSA) during a transmission opportunity in a transceiver circuitry of a portable device.

20 Claims, 5 Drawing Sheets

SIGNAL BUFFERING FOR LICENSED SHARED ACCESS (LSA) TECHNOLOGY

BACKGROUND

Licensed Shared Access (LSA) was recently developed by the European Radio Spectrum Policy Group (RSPG) to propose new or additional means of complying, for example, with mobile operators' needs for additional spectrum bands. The reason being, dedicated spectrum bands in near future may be threatened by ever increasing number of available cellular operators for mobile communications.

In order to address this problem, LSA proposes mechanisms for introducing shared spectrum based solutions. For example, the mobile cellular operators may have access to additional licensed spectrum from other licensees such as a public safety, government, and so on, to which mobile cellular operators normally would not get access. Another approach to shared spectrum is Authorized Shared Access (ASA); however, ASA has a limited spectrum band as compared to LSA. Currently, LSA and ASA are generally at the conceptual level and these technologies are merely proposed shared spectrum access in the market.

As such, there is a need to implement an efficient usage of LSA and other secondary spectrum access such as TV White Space Technology, opportunistic spectrum access, Dynamic Spectrum Access (DSA), etc. especially in a context of device-to-device (D2D) back-to-the-future (B2TF) communications.

DETAILED DESCRIPTION

Described herein is a technology for implementing a method of using Licensed Shared Access (LSA) technology by a LSA licensee such as, for example, in a context of device-to-device (D2D) back-to-the-future (B2TF) communications. Particularly, for example, the method described herein reduces a time cost of accessing a LSA spectrum (i.e., during a transmission opportunity) by implementing an immediate data transmission in a user plane, while a spectrum negotiation phase is taking place at a control plane (i.e., base station). In this example, the method may similarly apply to all other secondary spectrum access such as TV White Space Technology, opportunistic spectrum access, Dynamic Spectrum Access (DSA), etc.

In an implementation, an incumbent primary spectrum holder (hereinafter referred to as incumbent) is assigned with a particular spectrum band for its dedicated usage. The incumbent may be allowed by LSA technology or standard, to share the use of this particular spectrum band to another mobile network, another group of wireless network, or any other alternate spectrum holder (hereinafter referred to as LSA licensee). In the above implementation, the LSA licensee may be allowed to share or access the spectrum band of the incumbent during the transmission opportunity and based upon a deterministic spectrum access. The transmission opportunity, for example, includes a period of time during which the incumbent is not accessing its assigned spectrum band within a given geographic area and/or a particular period.

With the deterministic spectrum access, the LSA spectrum availability over time, space and frequency may be pre-configured and stored in transmitting and receiving devices of the LSA licensee. That is, the transmitting and receiving devices of the LSA licensee has advance knowledge of time, space, and frequency details of the transmission opportunity.

Upon detection of the short term transmission opportunity (or spectrum opportunity), an ad-hoc transmitting mobile device of the LSA licensee may immediately transmit a data signal even before the LSA licensee has set up the use of the LSA spectrum within its network (i.e., base stations and client devices). Afterwards, the transmitted data signal may be demodulated and stored or buffered by a receiving mobile device, and the stored demodulated data signal may either be subsequently decoded or flushed from the receiving mobile device.

For example, when the receiving mobile device receives a control signal from a base station instructing the receiving mobile device to go ahead with the decoding process, then the receiving mobile device implements subsequent decoding of the stored demodulated data signal. Otherwise, the stored demodulated data signal may be flushed out from the receiving mobile device where no control signal is received within a holding period.

Figure 1:
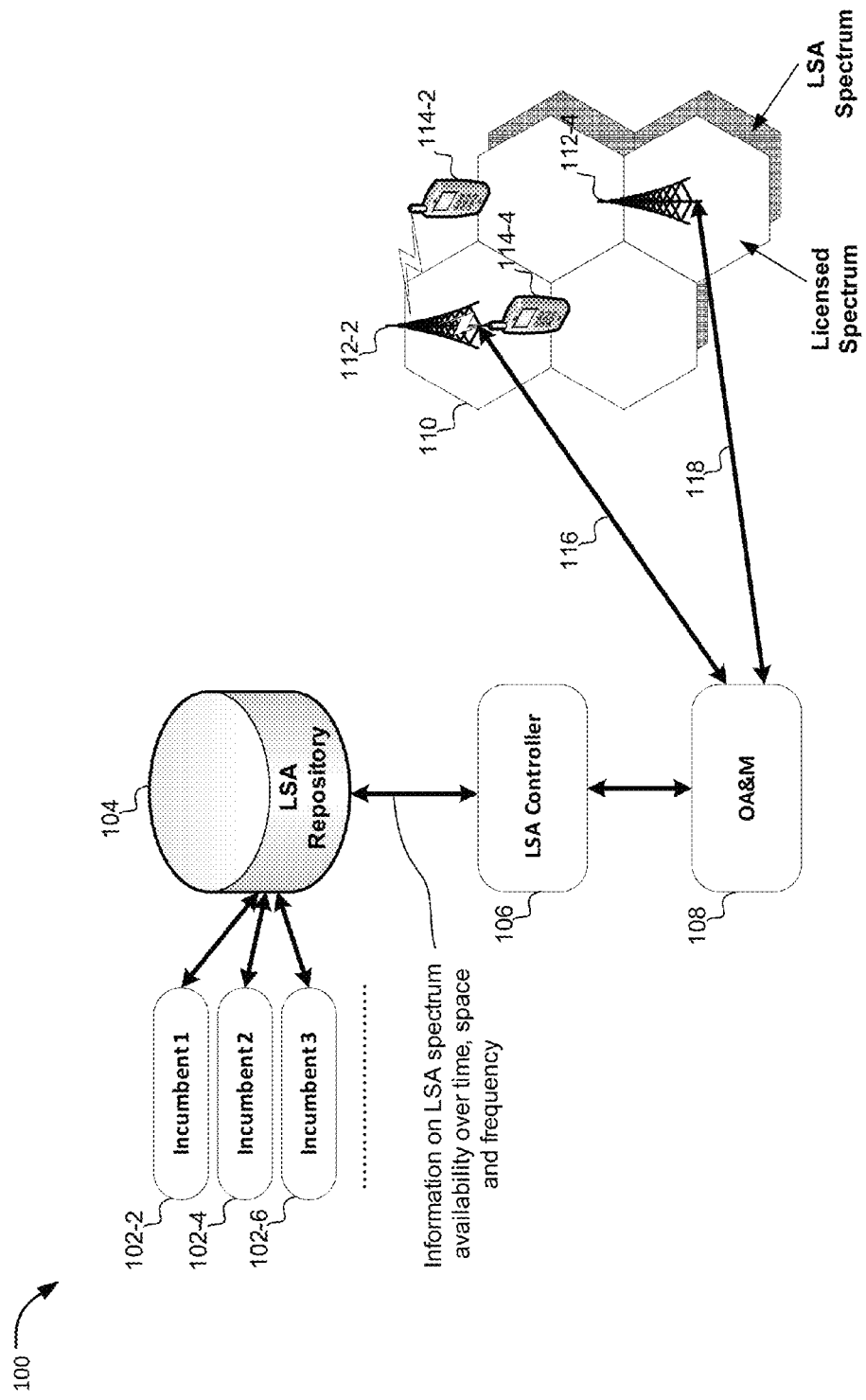
FIG. 1 illustrates an example scenario that implements usage of Licensed Shared Access (LSA) technology as described in accordance with implementations herein.

FIG. 1 is an example scenario 100 that implements usage of Licensed Shared Access (LSA) technology spectrum as described in present implementations herein. Particularly, the LSA spectrum in the example system 100 is utilized in a device-to-device (D2D) communications context. As shown, the scenario 100 includes incumbents 102, a LSA repository 104, a LSA controller 106, an operations/administration/and maintenance (OA&M) server 108, a LSA licensee 110 that further include a base station 112 and a mobile device 114, and wireless signal links 116 and 118.

The incumbents 102-2, 102-4, and 102-6 may include the primary users of the concerned spectrum bands as described in present implementations herein. For example, in European countries, the incumbents 102 may operate at about 2.3-2.4 GHz and the incumbents 102 may include Wireless Cameras (ENG systems=Electronic News Gathering), Aircraft Telemetry Services, PMSE, Amateur Radio, and the like. In the United States, however, the incumbents 102 may operate at about 3.5 GHz and the incumbents 102 may include mainly Naval Radar systems. In these examples, the incumbent 102's assigned or licensed spectrum bands may provide dependable quality service over a wide range of system loads, and may further promote security for large-scale deployments.

In an implementation, the incumbents 102 may update the LSA repository 104 of their respective LSA spectrum availability over time, space and frequency. In other words, the LSA Repository 104 may correspond to a database that stores information on spectrum availability over time and/or space and/or frequency. Typically, the information may be provided by the incumbents 102, but alternatively, the information may be derived through sensors such as in the case where the sharing of spectrum bands may affect national security (e.g., Naval Radar information).

With the stored information in the LSA repository 104, the LSA controller 106 may be configured, for example, to access the LSA Repository 104 in order to access the information that is related to the availability of spectrum bands for the LSA licensee 110 over time and/or frequency and/or space. In this example, the LSA controller 106 may aggregate the information provided by multiple incumbents 102 and process this information in accordance to requirements/preferences of the concerned LSA licensee 110.

As an output, the LSA controller 106 may provide the information on available spectrum over time, frequency and space to the LSA licensee 110. Furthermore, the LSA controller 106 may manage the termination of the spectrum opportunity or the vacating of the LSA spectrum bands in cases where the incumbents 102 may reclaim the spectrum over a given time period and/or frequency band and/or geographic area. Typically, the LSA controller 106 interacts with the LSA licensee 110 through the LSA licensee's OA&M 108.

With continuing reference to FIG. 1, the LSA licensee 110 may include, for example, a cellular network operator that utilizes a particular dedicated frequency spectrum band which may be different from the assigned spectrum bands of the incumbent 102. That is, the LSA licensee 110 may have its own dedicated and/or assigned spectrum band and on the side, the LSA licensee 110 may be allowed or authorized to share or access the spectrum band of the incumbent 102 during the transmission opportunity. When the incumbent 102 reclaims the use of the shared spectrum bands, the LSA licensee 110 may fall back to its dedicated frequency spectrum band to continue its current data communications operations.

When the transmission opportunity (as pre-configured) sets in, the D2D communication between the base station 112 and the mobile device 114, or between mobile devices 114, may implement immediate transmissions of data signals during a short duration of time of spectrum opportunity. That is, there is no requirement for a handshake mechanism between, for example, the transmitting mobile device 114-2 and a receiving mobile device 114-4 for the data signal to be transmitted. Furthermore, the immediate transmission of the data signal may be implemented regardless of whether the LSA licensee 110 has set up the use of the LSA spectrum bands over the base stations 112 and client mobile devices 114. To this end, a time cost of accessing the spectrum bands of the incumbent 102 during the transmission opportunity is substantially reduced.

As further discussed in details below, a receiving mobile device (e.g., mobile device 114-4) may be configured to buffer the received data signal without fully decoding the same. The decoding of the received data signal, for example, may take place when the receiving mobile device 114-4 receives a control signal instruction from the base station 112 to go ahead with the decoding of the buffered data signal. Without the control signal instruction from the base station 112, and after a holding time period, the receiving mobile device 114-4 may be configured to flush out from its buffer the stored received data signal.

The mobile devices 114-2 and 114-4 may include, but are not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. As shown, the mobile device 114-2, for example, may communicate with the other mobile device 114-4 in a network environment that utilizes the base station 112. In this example, the network environment may utilize a global system for mobile communications (GSM), a general packet radio services (GPRS), enhanced data rages for GSM evolution (EDGE), a 3G, a 4G LTE system, or other wireless network standards such as, but not limited to: cellular wide area radio communication technology (which may include e.g. a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-70 GHz and above), WiFi (IEEE 802.11a/b/g/n/ac/ad/af/etc.), WiMAX (IEEE 802.16a/e), etc.]

Figure 2:
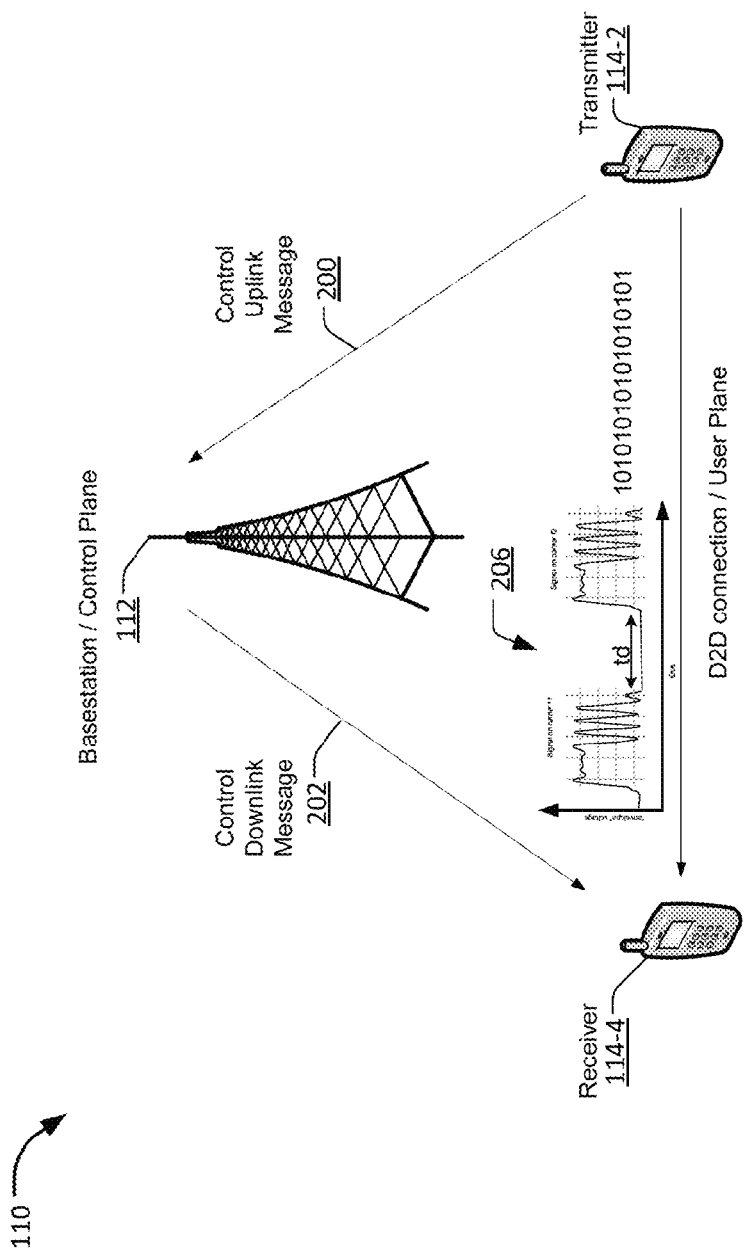
FIG. 2 illustrates an example mobile network in accordance with implementations described herein.

FIG. 2 illustrates an example LSA licensee 110 that implements the D2D communication as described in present implementations herein. For purposes of illustrating the implementations described herein, the LSA licensee 110 includes the mobile device 114-2 as an ad-hoc transmitting device, the mobile device 114-4 as an ad-hoc receiving device, a control uplink message 200, a control downlink message 202, and data signal 206 that is transmitted by the transmitting mobile device 114-2 during the transmission opportunity.

In an implementation, during the short duration of the transmission opportunity, the transmitting mobile device 114-2 may establish the D2D connection by performing immediate transmission of the data signal 206 towards the receiving mobile device 114-4. That is, without waiting for the initial spectrum negotiation phase to establish the network communication in the LSA licensee 110, the immediate parallel transmission of the data signal 206 may implement a signal buffering at the receiving mobile device 114-4 to efficiently utilize rather than waste the portion of the time that may be consumed by the initial spectrum negotiation phase. In other words, the time cost of accessing the shared spectrum band of the incumbent 102 is effectively reduced to zero.

In an implementation, the data signal 206 may include a specific training sequence (not shown) in its preamble so that the ad-hoc receiving mobile device 114-4 may detect that a new frame or initial frame (i.e., data signal 206) is being received. In this implementation, the initial frame may further include useful data packets that may be transmitted during the transmission opportunity. Although the data packets in the signal 206 may not be immediately decoded without a go signal from the base station 112, that portion of the transmission opportunity that may be spent during spectrum negotiation phase is not wasted due to parallel transmission of the data signal 206 as described.

In order to detect the new frame or initial frame, the receiving mobile device 114-4 may be configured to scan for the presence or occurrence of the specific training sequence in the preamble of the data signal 206. For example, the receiving mobile device 114-4 may include a transceiver architecture (not shown) that utilizes a substantially low complexity during the scanning mode. That is, the low complexity may lead to low power consumption in order to maximize the efficiency of the transceiver architecture. In this example, as further discussed below, the transceiver architecture may include two paths. A first path may be utilized to scan the specific training sequence that triggers the D2D connection mode when receiving the useful data sequence (i.e., data signal 206), while a second path may be utilized for an actual reception or demodulation of the data signal 206. The second path, for example may further include a standard receiver architecture as shown and discussed in FIG. 4 below.

In a case where the transmission opportunity disappears abruptly and without notice such as when the incumbent 102 is claiming back the use of its assigned spectrum band, the transmitting mobile device 114-2 may be configured to send a control signal through the preamble of the data signal 206. The control signal may signify that the D2D communication will be shifting to another spectrum band or frequency channel. For example, the preamble may denote going back to the dedicated frequency channel that was initially assigned to the LSA licensee 110. Alternatively, there is no need for the control signal when the incumbent 102 is reclaiming the spectrum band at the end of the transmission opportunity.

Although the D2D communication described above illustrates the D2D communication between the mobile devices 114 in the LSA licensee 110, the implementations described herein may similarly apply, for example, to the exploitation of short "White Space Intervals" in white space communications, or any other opportunistic spectrum access technology such as TV White Space Access, Short Range Devices Spectrum Access, Unlicensed (license-exempt) Spectrum Access, and the like. That is, a maximum exploitation of the transmission opportunity in the opportunistic spectrum access technology may be implemented by utilizing an LSA enabled user plane channel even before the dedicated control plane channel is set up.

With continuing reference to FIG. 2, the receiving mobile device 114-2 may utilize the control downlink message 202, for example, on its downlink data communication operations. In another example, the receiving mobile device 114-2 may use the control downlink message 202 to detect the completion of the spectrum negotiation phase.

Similarly, the transmitting device 116-2 may utilize the control uplink message 200 for its uplink data communications. The frequency spectrum band of the control downlink message 202 and the control uplink message 200 in the control plane may be configured to avoid collision with the parallel transmission of the data signal 206 in the user plane.

Figure 3:
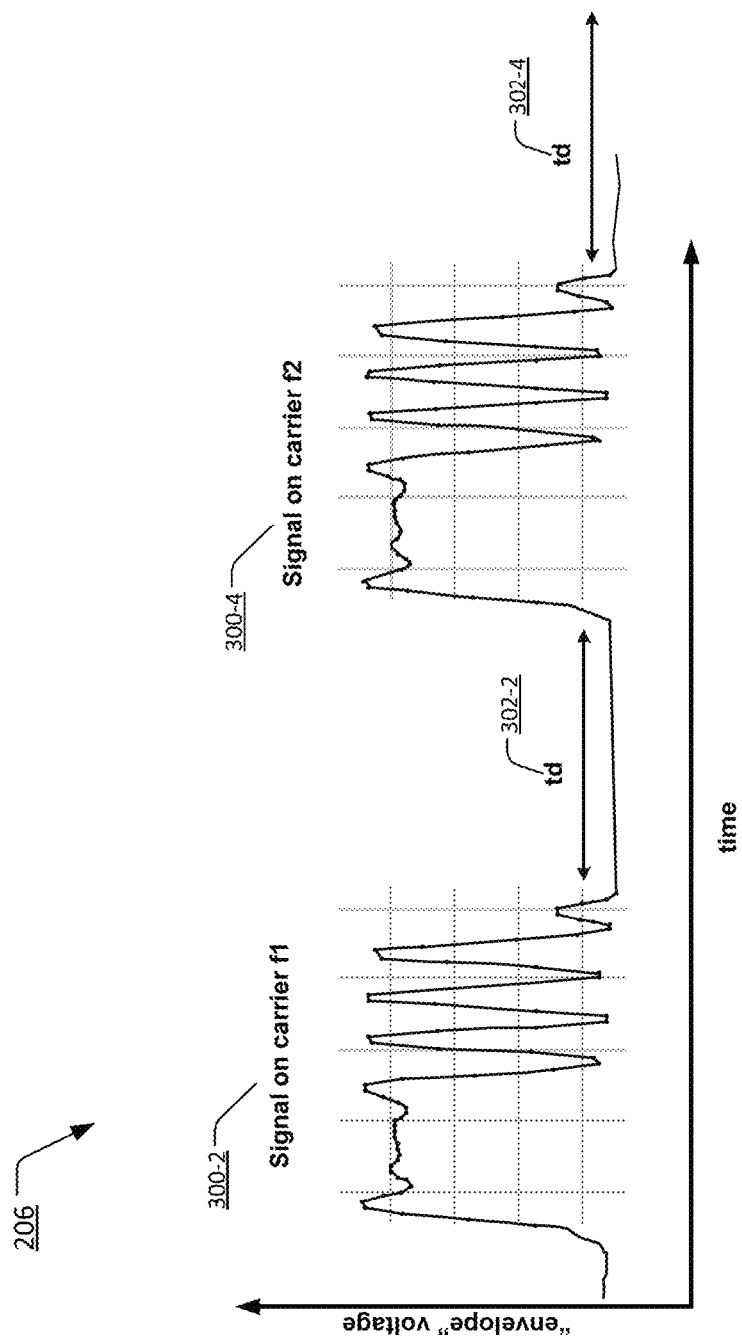
FIG. 3 illustrates an example data signal as described in accordance with implementations herein.

FIG. 3 illustrates an exemplary data signal 206 as described in present implementations herein. As shown, the data signal 206 may include a set of "k" frequency carriers or hereinafter referred to as frequencies 300-2, 300-4, 300-6 (not shown), . . . and 300-$k$ (not shown). Furthermore, the data signal 206 may include a time delay td 302-2, 302-2 (not shown), . . . and 302-($k$–1) (not shown), in between the frequency 300.

In an implementation, a preamble (not shown) of the data signal may be pre-configured to signify transmission of data packets while the spectrum negotiation phase at the control plane (i.e., base station 112) is currently being processed. That is, before the receiving mobile device 114-4 acquires knowledge that the spectrum negotiation phase has been processed at the control plane, the receiving mobile device 114-4 may receive the data signal 206 with the knowledge that it was transmitted by an ad-hoc mobile device and in parallel with the spectrum negotiation phase. As discussed above, the receiving mobile device 114-4 may buffer the received data signal 206 and the receiving mobile device 114-4 may not decode the data signal 206 until it receives another control signal from the base station 112 to do so.

In an implementation, the frequencies 300 and time delay 302 are pre-configured prior to setting up of the D2D connection. For example, the number of n-digit binary code for the data signal 206 is identified where "n" includes small number of bits. In another example, a range of "m" values for the time delay 302 may further be identified where "m" is a number that may be represented by a binary number with small number of bits.

By using the pre-configured time delay 302 as described above, the receiver architecture of the receiving mobile device 114-4 may accurately identify the sequence training (i.e., preamble) that may be transmitted in the corresponding frequencies 300. That is, the preamble that may be repeatedly transmitted after the time delay period may facilitate higher throughput in the receiver architecture of the receiving mobile device 114-4.

In the case where the incumbent 102 may reclaim the transmission opportunity as described above, the preamble of the data packets in the data signal 206 may be configured to signal a change in operating spectrum band. For example, the transmitting mobile device 112-2 may send the pre-configured data packet that signifies a change in operating spectrum band. The change in operating spectrum band, for example, may allow the LSA licensee 110 to revert back to its original dedicated spectrum band.

Figure 4:
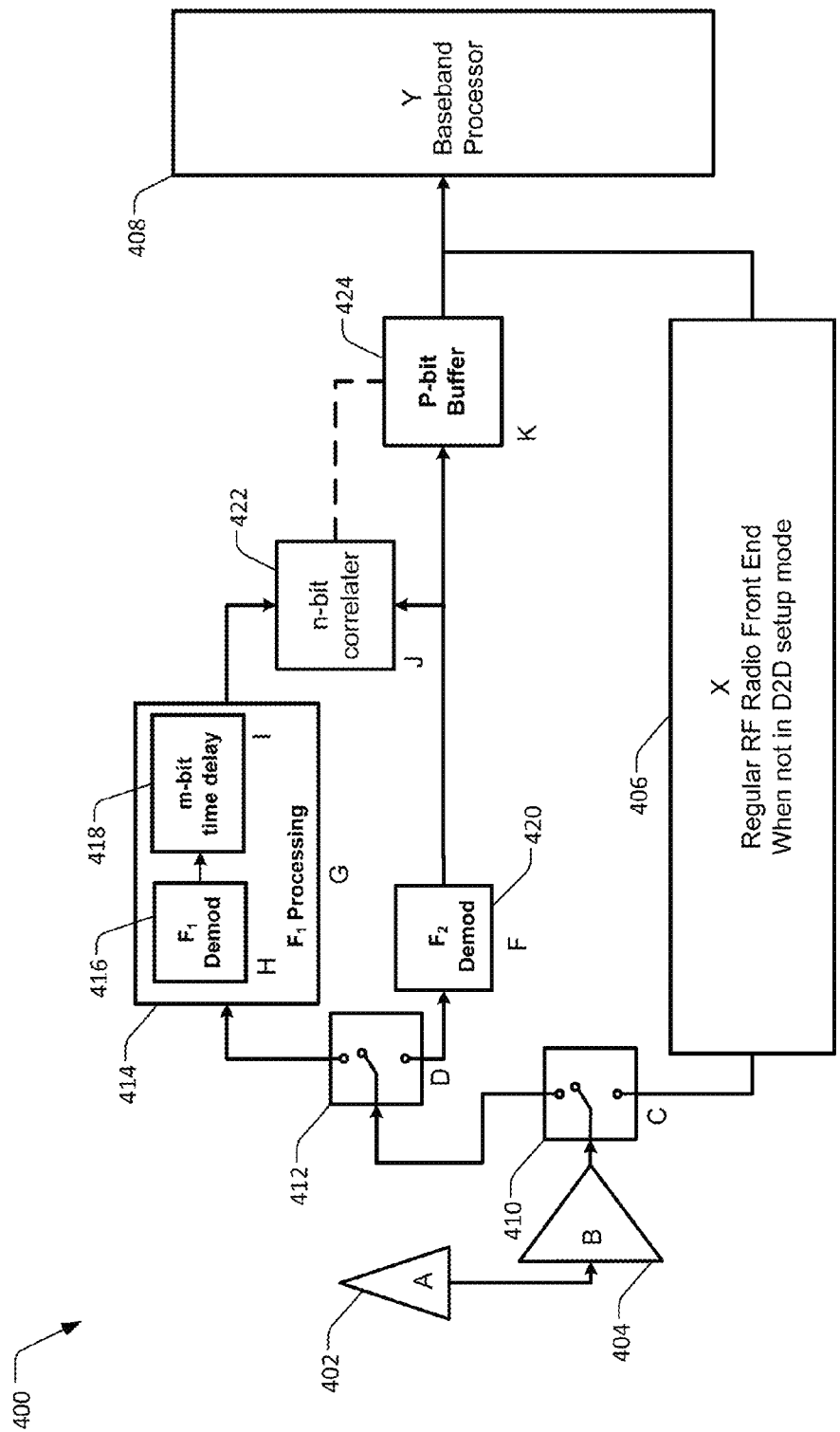
FIG. 4 illustrates an exemplary transceiver system as described in accordance with implementations herein.

FIG. 4 is an example transceiver system 400 of the mobile device as described in present implementations herein. In a non-D2D connection mode, received RF signals may be processed through a receiving antenna 402, a low-noise amplifier (LNA) 404, a RF to baseband (BB) converter 406, and a BB processor 408. However, when the D2D connection mode is activated (e.g., transmission opportunity is detected from the preamble of the data signal or based on deterministic spectrum access), the received RF signals such as the data signals 206 may be processed through a first switch 410, a second switch 412, a first frequency processor 414 that further includes a first frequency demodulator 416 and a time delay processor 418, a second frequency processor 420, an n-bit correlater component 422, a P-bit buffer component 424, and then to the BB processor 408.

As an initial setup, the transceiver system 400 may be configured to support more complex arrangements of the frequencies 300, time delays 302, and/or the n-bit binary code bits. However, a simpler transceiver system 400 may be configured to reduce complexity when using any of the frequencies 300, time delays 302, and/or the n-bit binary code bits. For example, the frequencies 300 may include a total number that is below the "k" total number of frequencies. In another example, the first frequency 300-2 may be equal in value to the second frequency 300-4, and so on. These possible values for the frequencies 300, time delays 302, and/or the n-bit binary code bits may constitute the D2D back to the future (B2TF) protocol for a given hardware release. That is, a standards body or network operator/handset manufacturer may need to decide on these values for the sake of real-world operations as implemented in the hardware.

With continuing reference to FIG. 4, the transceiver system 400 may be configured to implement the D2D B2TF protocol as mentioned above. For example, when the receiving mobile device 114-4 detects the presence of the incoming initial frame or data signal 206, the first switch 410 may be configured to change from its default position (i.e., connected to the RF to BB converter 406) to the D2D connection mode. In this example, the D2D connection mode processes the received data signals 206 by using the first frequency processor 414, second frequency processor 420, the n-bit correlater component 422, P-bit buffer component 424, and the BB processor 408. As noted above, the detection of the presence of the data signal 206 may be based upon the pre-configured preamble of the data packets in the data signal 206.

With the received data signal 206, the second switch 412 may be configured to facilitate the receiving of the modulated data signal 206 from the first switch 410 to the first frequency processor 414 during the D2D connection mode. That is, when the first frequency processor 414 acknowledges the detection of data packets on the first frequency 300-2, the first frequency processor 414 may then allow the processing of the data packets in the first frequency demodulator 416. In this example, the data packets that were transmitted using the first frequency 300-2 are demodulated by the first frequency demodulator 416 to produce a first demodulated data packet. Afterwards, the first demodulated data packet may pass through the time delay processor 418, which may be configured to implement the time delay (td) 302.

For example, the time delay processor 418 may be configured to implement the time delay (td) 302 based on D2D B2TF protocol standard for the particular hardware of the transceiver system 400. In this example, the time delay processor 418 may facilitate the time of arrival of the first demodulated data packet—at the P-bit buffer component 424—to be the same as that of the data packets in the second frequency 300-4, which is to be demodulated by the second frequency processor 420.

After processing the data packets in the first frequency 300-2 of the data signal 206 by the first frequency processor 414, the first frequency processor 414 may be configured to send back the data signal 206 to the second frequency processor 420 for further processing of the data packets in the second frequency 300-4 of the data signal 206. In another implementation, the second switch 412 may be configured to filter the first frequency 300-2 from the second frequency 300-4, and send the first frequency 300-2 and the second frequency 300-4 to the first frequency processor 414 and the second frequency processor 420, respectively.

In an implementation, the second frequency processor 420 may be configured to demodulate the data packets contained in the second frequency 300-4 to produce a second demodulated data packet and afterward, send the second demodulated data packet to the n-bit correlater component 424. In this implementation, the n-bit correlater component 424 may compare a correlation between the second demodulated data from the second frequency 300-4 and the time delayed first demodulated data from the first frequency 300-2.

For example, when the n-bit correlater component 424 detects a correlation between the two sets of demodulated data packets, then the P-bit buffer component 424 is activated or turned ON and the demodulated data is buffered up to P-bits worth of data signal 206. In this example, the correlation may include checking if the two identical n-bit QPSK, QAM, and other similar waveforms have proper pattern of n-bits. With the detection of this correlation and furthermore, when the receiving mobile device 114-4 receives the control signal from the base station 112 to go ahead with the decoding of the data signals 206 that were transmitted during the transmission opportunity, then the P-bits worth of data signal 206 may then be decoded and sent to the baseband processor 408 for further processing. Otherwise, the P-bits worth of data signal 206 is flushed out in a case where no control signal is received from the base station 112 to go ahead with the decoding of the data signals 106.

However, when the n-bit correlater component 424 does not detect a correlation between the two sets of demodulated data packets, then the P-bit buffer component 424 may not be activated (i.e., remains at OFF state) and the second switch 412 is reset to send back the data signal 206 to the first frequency processor 414.

In an implementation, the P-bit buffer component 424 may be configured to store up to P-bits worth of data signal 206. In this implementation, the flushing of the stored P-bits worth of data signals 206 may be implemented every 100 microseconds to 100 milliseconds (depending on symbol holding times, buffer size and transmission frame lengths) should there be no control signal that is received by the receiving mobile device 114-4 within a holding period (i.e., pre-configured holding period) In this implementation, the flushing may be required in the case where receiving mobile device 114-4 may be an unintended receiver of the data signal 206, or that the base station 112 cannot establish the proper connection in the control plane.

With continuing reference to FIG. 4, the transceiver system 400 may revert back to its normal RF operations when the receiving mobile device 114-4 detects the preamble that may signify the termination of the transmission opportunity. That is, the incumbent 102 is re-claiming back the use of its assigned spectrum band that is currently being shared and accessed by the LSA licensee 110 during the transmission opportunity. The normal RF operations, for example, receives and demodulates the received RF signals through the LNA 404, the RF to BB converter 406, and then to the BB processor 408.

Figure 5:
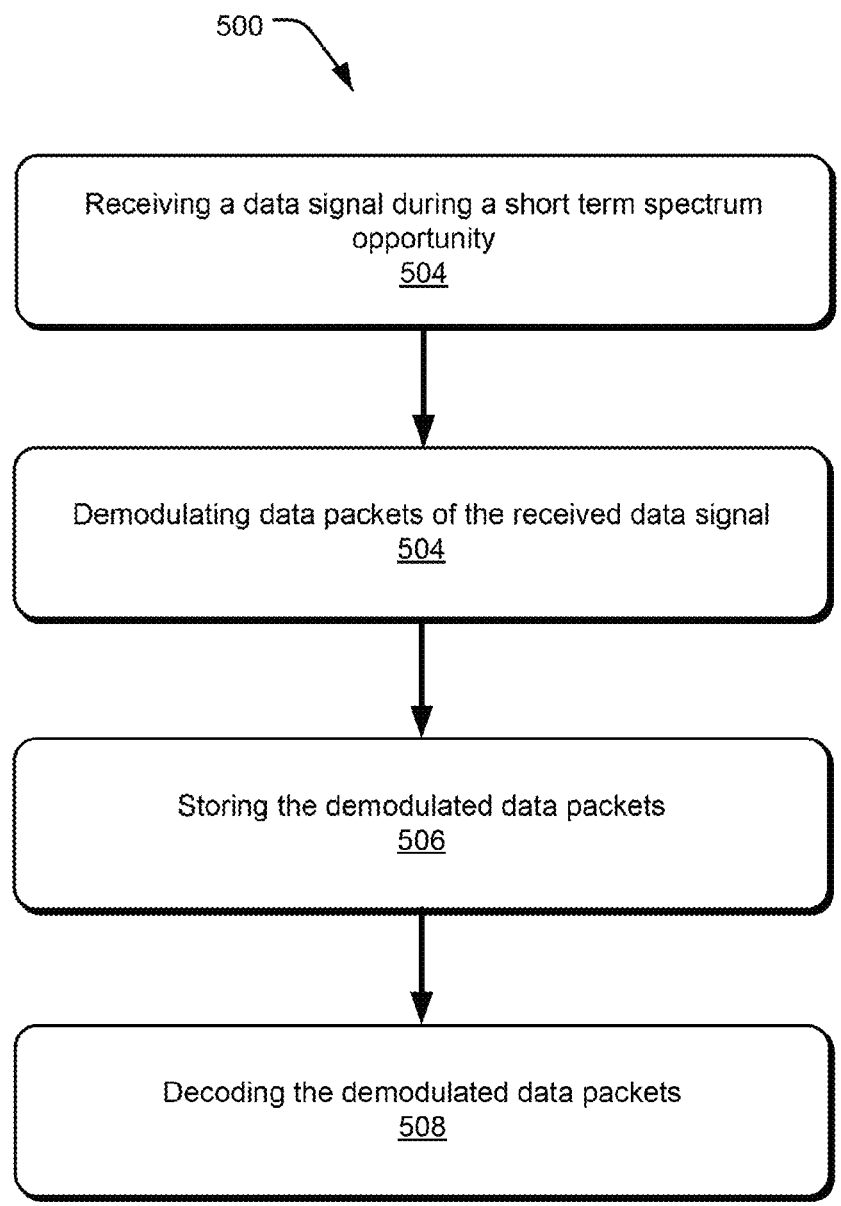
FIG. 5 illustrates an exemplary process for using Licensed Shared Access (LSA) technology as described in present implementations herein.

FIG. 5 shows an example process flowchart 500 illustrating an example method for using the LSA in a D2D B2TF communications context as described in present implementations herein. The process flowchart 500, for example, is implemented at the side of the receiving mobile device 114-4. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, receiving a data signal during a short term spectrum opportunity is performed. For example, a LSA spectrum availability over time, space, and frequency that defines the short term spectrum opportunity is pre-configured in the receiver mobile device 114-4. In this example, the data signal is received during the LSA spectrum availability over time, space, and frequency. In this example, the transmitting and receiving devices have advance knowledge (i.e., pre-configured) of the LSA spectrum availability over time, space, and frequency.

At block 504, demodulating data packets of the received data signal is performed. For example, the transceiver system 400 of the receiving mobile device 114-4 activates its D2D connection mode upon the receiving of the data signal 206. In this example, the received data signal 206 may be processed through the first frequency processor 414, the second frequency processor 420, etc. as discussed in FIG. 4 above.

At block 506, storing the demodulated data packets is performed. For example, the P-bit buffer component 424 may be configured to store P-bits worth of data signals 206. In this example, the P-bits worth of data signals 206 may be either decoded or flushed out from the P-bit buffer component 424. The decoding is performed when the transceiver system 400 receives a control signal from the base station 112 that indicates the go-signal for the decoding of the buffered data signal 206. Otherwise, the P-bits worth of data signals 206 are flushed out from the P-bit buffer component 424.

At block 508, decoding the demodulated data packets is performed.

The following examples pertain to further embodiments:

Example 1 is a method of using Licensed Shared Access (LSA) technology at a receiver device, the method comprising: receiving a data signal during a short term spectrum opportunity of a LSA spectrum having a preconfigured availability over time, space, and frequency in the receiver device; demodulating data packets of the received data signal; receiving a control signal within a holding period, wherein the control signal comprises an instruction for the receiver device to decode the demodulated data packets; decoding the demodulated data packets upon receiving the control signal; and transferring the decoded packets to a dedicated spectrum band at an end of the short term spectrum opportunity.

In Example 2, the method as recited in Example 1, wherein the short term spectrum opportunity is based upon a sharing agreement between the receiving device and an incumbent device.

In Example 3, the method as recited in Example 1, wherein receiving the data signal includes detecting a preamble in the data packets of the data signal, wherein the preamble indicates that the data signal is transmitted by another device during a LSA spectrum band negotiation phase.

In Example 4, the method as recited in Example 1, wherein receiving the data signal further comprises: activating a device-to-device (D2D) connection mode of the receiving device.

In Example 5, the method as recited in Example 1, wherein the demodulating data packets further comprises: demodulating a first data packet in a first frequency carrier of the data signal; implementing a time delay on the demodulated first data packet; demodulating a second data packet in a second frequency carrier of the data signal; and correlating the time delayed first data packet with the second data packet.

In Example 6, the method as recited in Example 5, wherein detecting correlation comprises activating a buffering component to store the demodulated data packets.

In Example 7, the method as recited in Example 5, wherein a preamble training sequence is transmitted over the first and second data packets, wherein the correlating further includes checking a proper pattern of n-bits for the first and second data packets.

In Example 8, the method as recited in any of Examples 1 to 7 further comprising flushing the stored demodulated data packets after the holding period if no control signal is received from a base station.

In Example 9, the method as recited in any of Examples 1 to 7 further comprising detecting the LSA spectrum availability over time, space, and frequency when the short term spectrum opportunity is not pre-configured in the receiving device.

Example 10 is a receiver device comprising: an antenna configured to receive a data signal during a short term spectrum opportunity, wherein a LSA spectrum availability over time, space, and frequency that defines the short term spectrum opportunity is pre-configured in the receiver device; a demodulator component configured to demodulate the received data signal; a buffer component configured to store the demodulated data signal; and a baseband processor configured to decode the stored demodulated data signal.

In Example 11, the receiver device as recited in Example 10, wherein the demodulator component includes a first demodulator and a second demodulator to demodulate a first frequency carrier and a second frequency carrier, respectively, of the data signal.

In Example 12, the receiver device as recited in Example 10, wherein the buffer component is configured to receive a control signal from a base station within a holding period, wherein the control signal includes an instruction for the buffer component to forward the stored demodulated data packets to the baseband processor for decoding of the stored demodulated data packets.

In Example 13, the receiver device as recited in Example 12, wherein the buffer component is configured to flush the stored demodulated data packets after the holding period where no control signal is received.

In Example 14, the receiver device as recited in any of Examples 11 to 13 further comprising: a time delay processor configured to delay the demodulated data signal from an output of the first demodulator; and an n-bit correlater component configured to receive and relate the time delayed demodulated data signal with a demodulated data signal from the second frequency carrier.

Example 15 is a method of using a Licensed Shared Access (LSA) technology by a LSA licensee receiver device, the method comprising: receiving a data signal during a short term spectrum opportunity, wherein a LSA spectrum availability over time, space, and frequency that defines the short term spectrum opportunity is pre-configured in the receiver device; demodulating data packets of the received data signal, wherein the demodulating data packets further comprises: demodulating a first data packet in a first frequency carrier of the data signal to derive a first demodulated data packet; implementing a time delay on the first demodulated data packet; demodulating a second data packet in a second frequency carrier of the data signal to derive a second demodulated data packet; correlating the time delayed first demodulated data packet with the second demodulated data packet; and storing the first and second demodulated data packets; receiving a control signal within a holding period, wherein the control signal includes an instruction for the receiver device to decode the stored first and second demodulated data packets; and decoding the first and second demodulated data packets.

In Example 16, the method as recited in Example 15, wherein the short term spectrum opportunity is based upon a sharing agreement between the receiving device and an incumbent device.

In Example 17, the method as recited in Example 15, wherein the receiving of the data signal includes a detection of a preamble in the data packets of the data signal, wherein the preamble indicates that the data signal is transmitted by another device during a LSA spectrum band negotiation phase.

In Example 18, the method as recited in Example 15, wherein the receiving of the data signal further comprises: activating a device-to-device (D2D) connection mode of the receiving device.

In Example 19, the method as recited in of any of Examples 15 to 18 further comprising: flushing of the stored demodulated data packets after the holding period where no control signal is received from a base station.

In Example 20, the method as recited in of any of Examples 15 to 18 further comprising detecting the LSA spectrum availability over time, space, and frequency when the short term spectrum opportunity is not pre-configured in the receiving device.

What is claimed is:

1. A method of using Licensed Shared Access (LSA) technology at a receiver device, the method comprising:
    receiving a data signal during a short term spectrum opportunity of a LSA spectrum having a preconfigured availability over time, space, and frequency in the receiver device;
    demodulating data packets of the received data signal;
    receiving a control signal within a holding period, wherein the control signal comprises an instruction for the receiver device to decode the demodulated data packets;
    decoding the demodulated data packets upon receiving the control signal; and
    transferring the decoded packets to a dedicated spectrum band at an end of the short term spectrum opportunity.

2. The method as recited in claim 1, wherein the short term spectrum opportunity is based upon a sharing agreement between the receiving device and an incumbent device.

3. The method as recited in claim 1, wherein receiving the data signal includes detecting a preamble in the data packets of the data signal, wherein the preamble indicates that the data signal is transmitted by another device during a LSA spectrum band negotiation phase.

4. The method as recited in claim 1, wherein receiving the data signal further comprises: activating a device-to-device (D2D) connection mode of the receiving device.

5. The method as recited in claim 1, wherein the demodulating data packets further comprises:
    demodulating a first data packet in a first frequency carrier of the data signal;
    implementing a time delay on the demodulated first data packet;
    demodulating a second data packet in a second frequency carrier of the data signal; and
    correlating the time delayed first data packet with the second data packet.

6. The method as recited in claim 5, wherein detecting correlation comprises activating a buffering component to store the demodulated data packets.

7. The method as recited in claim 5, wherein a preamble training sequence is transmitted over the first and second data packets, wherein the correlating further includes checking a proper pattern of n-bits for the first and second data packets.

8. The method as recited in claim 1 further comprising flushing the stored demodulated data packets after the holding period if no control signal is received from a base station.

9. The method as recited in claim 1 further comprising detecting the LSA spectrum availability over time, space, and frequency when the short term spectrum opportunity is not pre-configured in the receiving device.

10. A receiver device comprising:
    an antenna configured to receive a data signal during a short term spectrum opportunity, wherein a LSA spectrum availability over time, space, and frequency that defines the short term spectrum opportunity is pre-configured in the receiver device;
    a demodulator component configured to demodulate the received data signal;
    a buffer component configured to store the demodulated data signal; and
    a baseband processor configured to decode the stored demodulated data signal.

11. The receiver device as recited in claim 10, wherein the demodulator component includes a first demodulator and a second demodulator to demodulate a first frequency carrier and a second frequency carrier, respectively, of the data signal.

12. The receiver device as recited in claim 11 further comprising:
    a time delay processor configured to delay the demodulated data signal from an output of the first demodulator; and
    an n-bit correlater component configured to receive and relate the time delayed demodulated data signal with a demodulated data signal from the second frequency carrier.

13. The receiver device as recited in claim 10, wherein the buffer component is configured to receive a control signal from a base station within a holding period, wherein the control signal includes an instruction for the buffer component to forward the stored demodulated data packets to the baseband processor for decoding of the stored demodulated data packets.

14. The receiver device as recited in claim 13, wherein the buffer component is configured to flush the stored demodulated data packets after the holding period where no control signal is received.

15. A method of using a Licensed Shared Access (LSA) technology by a LSA licensee receiver device, the method comprising:
   receiving a data signal during a short term spectrum opportunity, wherein a LSA spectrum availability over time, space, and frequency that defines the short term spectrum opportunity is pre-configured in the receiver device;
   demodulating data packets of the received data signal, wherein the demodulating data packets further comprises:
      demodulating a first data packet in a first frequency carrier of the data signal to derive a first demodulated data packet;
      implementing a time delay on the first demodulated data packet;
      demodulating a second data packet in a second frequency carrier of the data signal to derive a second demodulated data packet;
      correlating the time delayed first demodulated data packet with the second demodulated data packet; and
   storing the first and second demodulated data packets;
   receiving a control signal within a holding period, wherein the control signal includes an instruction for the receiver device to decode the stored first and second demodulated data packets; and
   decoding the first and second demodulated data packets.

16. The method as recited in claim 15, wherein the short term spectrum opportunity is based upon a sharing agreement between the receiving device and an incumbent device.

17. The method as recited in claim 15, wherein the receiving of the data signal includes a detection of a preamble in the data packets of the data signal, wherein the preamble indicates that the data signal is transmitted by another device during a LSA spectrum band negotiation phase.

18. The method as recited in claim 15, wherein the receiving of the data signal further comprises: activating a device-to-device (D2D) connection mode of the receiving device.

19. The method as recited in claim 15 further comprising: flushing of the stored demodulated data packets after the holding period where no control signal is received from a base station.

20. The method as recited in claim 15 further comprising detecting the LSA spectrum availability over time, space, and frequency when the short term spectrum opportunity is not pre-configured in the receiving device.

* * * * *